United States Patent [19]
Rahrig et al.

[11] Patent Number: 4,801,627
[45] Date of Patent: Jan. 31, 1989

[54] GLASS FIBER REINFORCED VINYL CHLORIDE POLYMER PRODUCTS AND PROCESS FOR THEIR PREPARATION

[75] Inventors: Douglas B. Rahrig, Racine, Wis.; Angelo J. Magistro, Brecksville; Richard G. Parker, Hudson, both of Ohio

[73] Assignee: The B. F. Goodrich Company, Akron, Ohio

[21] Appl. No.: 897,437

[22] Filed: Aug. 18, 1986

[51] Int. Cl.$^4$ .............................................. C08K 9/00
[52] U.S. Cl. ..................................... 523/209; 523/212; 523/213; 523/214; 428/251; 428/288; 428/290; 428/291; 428/391; 428/392; 264/142
[58] Field of Search ................. 523/209, 212, 213, 214

[56] References Cited

U.S. PATENT DOCUMENTS 4,536,360 8/1985 Rahrig .................................. 428/392

Primary Examiner—Sharon A. Gibson
Attorney, Agent, or Firm—James R. Lindsay; Alfred D. Lobo

[57] ABSTRACT

Vinyl chloride (VC) resins, particularly poly(vinyl chloride) (PVC) and chlorinated poly(vinyl chloride) (CPVC) are reinforced with glass fibers which have been sized with a particular aminosilane coupling agent and a particularly characterized basic film former. At the processing temperature of VC resin, containing a stabilizer against degradation during thermoforming, for example in an extruder, or on a mixing mill used to blend the resin with sized glass fibers, a reaction occurs between an aminosilane coupling agent and the VC resin which reaction involves C=C bonds in the homopolymer, provided the polymer film former in the size is more basic than poly(vinyl acetate) ("PVA"). The film former catalyzes the thermal dehydrohalogenation of the VC homopolymer at the fiber-resin interface so as to generate allylic Cl moieties in chains of the homopolymer, which moieties react with the amine groups of the aminosilane. The size is most conveniently coated on the fibers from a sizing solution, dispersion or emulsion containing the coupling agent and film former in which allylic Cl moieties in VC resin chains become covalently bonded to an aminosilane, so that even upon thorough extraction of a GFR VC composite with tetrahydrofuran (THF), sufficient bound VC resin remains so that X-ray photoelectron spectroscopic (XPS) examination indicates that the ratio of total chlorine to total carbon remaining on the surface of the glass fibers, i.e. the ratio of the areas of the "Cl(2p)/C(1s)" peaks, is at least 0.91.

7 Claims, No Drawings

GLASS FIBER REINFORCED VINYL CHLORIDE POLYMER PRODUCTS AND PROCESS FOR THEIR PREPARATION

BACKGROUND OF THE INVENTION

This invention is related to the reinforcing of vinyl chloride ("VC" for brevity) homopolymers with glass fibers, in the field of improving the physical strength characteristics of organic synthetic resinous materials. More particularly, this invention is related to thermoplastic, glass fiber reinforced ("GFR") poly(vinyl chloride) ("PVC") homopolymer, and chlorinated poly(vinyl chloride) ("CPVC") which homopolymers are commonly available as rigid PVC and CPVC, and are either individually or together referred to herein as "VC homopolymer".

More generally this invention is directed to copolymer of VC with a copolymerizable monomer, in which copolymers VC is present in an amount sufficient to generate an allylic chlorine (Cl) moiety in the VC chain, represented thus:

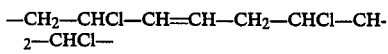

under thermoforming conditions. The copolymers may be postchlorinated provided there are sufficient runs of 10 or more C atoms in VC chains to generate reactive allylic Cl moieties. Such copolymers of VC, optionally postchlorinated, and VC homopolymer are generically referred to herein as "VC resin".

This invention is more particularly related to the use of an aminosilane coupling (or keying) agent (sometimes referred to as 'finish') which is essential, in combination with certain polymeric film formers used in the production of glass fibers, most preferably E glass, to provide the strength in our glass fiber reinforced ("GFR") VC resin composites.

It is well known that the key to providing satisfcatory strength in a GFR composite is the proper choice of "size" or "sizing" on the glass fibers which are coated with an aqueous sizing solution, suspension, or emulsion consisting essentially of water in which is dispersed a coupling agent, film former, lubricant, surface active agent, "antistat", plasticizer and the like, sometimes with a water-soluble colloid to provide the necessary stability for the dispersed polymeric film former. It is most important to use the correct combination of coupling agent and film former in the "size".

Glass fibers sized for use in our invention may be used in strands, rovings, tow or yarns, which are treated specifically for use in a GFR thermoplastic resin. Unsized glass fibers are also referred to as untreated, pristine, or bare glass.

The most widely used size for glass fibers used in GFR composites for general purpose reinforcing of resins contains a suspension of poly(vinyl acetate) particles in an aqueous medium. Polyesters, epoxides, poly(methyl methacrylate) and polystyrene are also used as film-formers sometimes on their own, sometimes as separate additives to the size, and sometimes as a copolymer with poly(vinyl acetate). No film former was considered to have a reactive or catalytic function in the composite.

The essential qualification of a size found satisfactorily to fulfil the strengthening function of glass fiber in VC resin is its (the size's) ability to generate allylic chlorine (Cl) moieties in a zone adjacent the surface of each glass fiber ("fiber-resin interface") where the moieties can react with the primary amine moiety of the coupling agent. This concept is taught and illustrated in U.S. Pat. No. 4,536,360 to Rahrig, the disclosure of which is incorporated by reference thereto as if fully set forth herein. The specific effective combination disclosed therein for a VC resin is (a) an aminosilane coupling agent, and, (b) a polymer film former of a ring-opened lower alkylene oxide containing 1 to 4 carbon atoms as an essential component in a repeating unit, for example poly(ethylene oxide:propylene glycol) ("PEO"), optionally containing another copolymerizable component.

Though the criticality as to the choice of PEO as the film former was recognized in the '360 patent, the function of PEO in catalyzing the formation of allylic Cl moieties, unrelated to that of the aminosilane, was not known, nor was the mechanism known by which that function was discharged. Since it is well known that the silane groups of the aminosilane are coupled to the surface of the glass leaving the amino groups projecting therefrom, it was hypothesized the PEO had a unique shrouding effect which did not adversely affect the reactivity of the amino groups which are known to generate the allylic Cl moiety. This hypothesis did not help us to define either the essential reactive function of a satisfactory film former (to be used in conjunction with an aminosilane in the size), or the film former's essential characteristics and generic structure.

SUMMARY OF THE INVENTION

It has been discovered that at the processing temperature of VC resin containing a stabilizer against degradation during thermoforming, for example in an extruder, or on a mixing mill used to blend the homopolymer with sized glass fibers, a reaction occurs between an aminosilane coupling agent and the homopolymer which reaction involves C=C bonds in the homopolymer, provided the polymer film former in the size is more basic than poly(vinyl acetate) ("PVA").

It is therefore a general object of this invention to provide a GFR VC composite in which the glass fibers are sized with (i) an aminosilane coupling agent, and (ii) a basic film former, more basic than PVA, present in an amount sufficient to catalyze the thermal dehydrohalogenation of the VC homopolymer at the fiber-resin interface so as to generate allylic Cl moieties in chains of the homopolymer, which moieties react with the amine groups of the aminosilane. The size is most conveniently coated on the fibers from a sizing solution, dispersion or emulsion containing the coupling agent and film former.

It has also been discovered that film formers derived from (i) polymers with a nitrogen-containing repeating unit such as an amine, amide, ureido, or urethane group, and (ii) dispersible or emulsifiable epoxide polymers, catalyze a reaction on which allylic Cl moieties in VC resin chains become covalently bonded to an aminosilane, so that even upon thorough extraction of a GFR VC composite with tetrahydrofuran (THF), sufficient bound VC resin remains so that X-ray pootoelectron spectroscopic (XPS) examination indicates that the ratio of total chlorine to total carbon remaining on the surface of the glass fibers, i.e. the ratio of the areas of the "Cl(2p)/C(1s)" peaks, is at least 0.91, and more preferably in the range from about 1.0 to about 1.2; further, that a ratio of 0.91 corresponds to a composite tensile strength of about 12,000 psi, and a ratio of 1.13 corresponds to a composite tensile strength of about 15,700 psi.

It is therefore a specific object of this invention to provide a GFR VC resin composite reinforced with glass fiber sized with an aminosilane coupling agent and a polymer film former selected from the group consisting of (i) a polymer with a nitrogen-containing repeating unit such as an amine, amide, ureido, or urethane group, and (ii) a dispersible or emulsifiable epoxide polymer, which composite, upon extraction with THF, and a subsequent XPS examination, yields a Cl(2p)/C(ls) ratio of at least 0.91, and more preferably of at least 1.13.

It is another specific object of this invention to provide a GFR VC homopolymer which is stabilized with a metallo-organic salt or soap, or an organometallic compound having a carbon-to-metal bond, in which the glass fibers are less than 1 mm long, and are sized with an aqueous solution, dispersion or emulsion consisting essentially of an aminosilane coupling agent represented by the formula

$$H_2NR^1-(R^1NH)_n-Si(R^2O)_3 \qquad (I)$$

wherein,
$R^1$ represents an alkylene group having from 2 to about 5 carbon atoms, n represents an integer in the range from 0 to 3, and $R^2$ represents alkyl having from 1 to about 6 carbon atoms; and, from 0.1 to about 1% by wt, based on the wt of glass, of a polymer film former selected from the group consisting of (i) a polymer with a nitrogen-containing repeating unit such as an amine, amide, ureido, or urethane group, and (ii) a dispersible or emulsifiable epoxide polymer, whereby upon thermoforming the GFR VC homopolymer the glass fibers are bonded to the homopolymer so strongly that a thermoformed composite fails in cohesive failure. By "cohesive failure" we refer to failure of a sample of GFR VC resin due to tearing of resin from resin, rather than tearing of resin from the glass surface ("adhesive failure"). Thus, cohesive failure is predicated upon the resin's properties rather than upon the bond between resin and glass.

It is still another object of this invention to provide pellets of the foregoing GFR VC homopolymer which may be thermoformed into a shaped article which is characterized by excellent dry strength, and also excellent wet strength after 168 hr (hours) of exposure to 50° C. water; which fails in cohesive failure; and, which has a tensile wet strength about equal to or better than the dry strength of an identical GFR composite with no film former.

DETAILED DESCRIPTION OF PREFERRED EMBODIMENTS

In the most preferred embodiment of the invention the VC resin reinforced with glass fibers is PVC homopolymer obtained by either the mass or suspension polymerization techniques, in the form of porous solid macrogranules. Macrogranules of PVC which are converted to CPVC will typically have an average diameter in excess of 20 microns, with a preponderance of particles in excess of 50 microns in diameter. Suspension polymerized PVC desirably has a porosity in the range from about 0.22 to about 0.35 cc/g, a surface area in the range from about 0.6 m²/g to about 3 m²/g, and an inherent viscosity in the range from about 0.53 to about 1.2, that is, having a relatively high molecular weight. The mol wt may be related to its inherent viscosity which is determined as taught in U.S. Pat. No. 4,412,898. The most commonly used PVC resins have an inherent viscosity in the range from about 0.53 to about 1.1, or slightly higher, and are referred to as "rigid PVC". Such a resin is commercially available from The B. F. Goodrich Company under the Geon ® 110X346 designation.

The reaction of aminosilane coupling agents with VC resin occurs through allylic Cl sites in the resin. It is this reaction which provides a covalent chemical linkage between the V resin and the aminosilane-treated glass fibers. Evidence for this conclusion is based on a comparison of the thermal stability of PVC on a two-roll mill, in the presence of aminosilane, with the stability in the absence of the aminosilane. The proton magnetic resonance spectra and the resonance Raman spectra of products we obtained by mixing treated glass fibers and PVC on the two-roll mill, confirm the fact that a reaction occurs between aminosilane and PVC during mixing, and that this reaction involves the C=C bonds present in the PVC. Whether these bonds are generated in a sufficient quantity at or near the interface of glass surface and VC resin, to strengthen the reinforcing effect of the glass fibers appreciably, depends on the basicity of the film former and the characteristics of the repeating units in its generic structure.

The effectiveness of the film former derives from its function as a catalyst to thermally dehydrohalogenate the VC resin. Evidence for this catalytic action is provided by the rate and extent of HCl evolution when the film former and VC resin are blended. Confirmation is provided with evidence that glass, coated with film former and blended with PVC, causes an increase in the overall extent of dehydrohalogenation and HCl evolution in the PVC, compared to either (a) unfilled PVC (no glass), (b) bare E-glass filled PVC, or (c) aminosilane treated E-glass filled PVC.

It will now be apparent that the beauty of the resin-to-glass coupling mechanism is that the film former on the glass not only fulfills its normal function of protecting the fibers and facilitating handling them, and incorporating them into resin, but once mixed into PVC at the appropriate temperature sufficient to fuse the PVC, which temperature is not high enough deleteriously to affect fused PVC's properties, the film former catalyzes the thermal dehydrohalogenation of PVC at the PVC-glass interface, yielding allylic Cl sites which react with the amino-functional ends of the aminosilane. A well coupled glass reinforced composite with improved thermal stability is thus obtained within the initial several minutes of processing the GFR VC resin composition.

It should be noted that a VC resin is typically stabilized with a metallo-organic salt or soap, or an organometallic compound having a carbon-to-metal bond, specifically to counter the thermal dehydrohalogenation of the VC resin during thermoforming, and such a stabilizer is essential in our composition. Surprisingly, however, it does not negate the same reaction catalyzed by the film former and aminosilane coupling agent.

The generic structure of the film former is not narrowly critical provided it is more basic than PVA which itself is basic. The relative basicity is determined by measuring the uptake of vapor of a low mol wt acid by the film former in a procedure more fully described in an article titled "Acid-Base Complexes of Polymers with Solvents" by Fowkes, F. M., et al pp 1-5, *Org. Coatings & Appl. Polymer Sci.*, 46(1), 1982, the disclosure of which is incorporated by reference thereto as if fully set forth herein. The essential criterion for desirable tensile strength of at least 12,000 psi is provided by sufficient basicity as evidenced by a Cl(2p)/C(1s) peak ratio of at least 0.91. Any film former of polyester, polyamine, polypyrrolidone, polysulfide, polyalkylene sulfide, or polymer with aromatic or olefin groups, which film former is sufficiently basic to yield the minimum Cl(2p)/C(1s) ratio, will provide an improvement in tensile strength. More preferred are those which produce at least double the tensile of an unreinforced VC resin, that is, without glass fibers.

Desirable film formers are derived from a polymer having (i) an alkyleneimine repeating unit, such as polyethyleneimine; (ii) an amide repeating unit, such as poly(vinyl pyrrolidone); (iii) a triazine-containing repeating unit such as melamine, or a ureyelene (-HNCONH-) repeating unit; (iv) a urethane repeating unit such as in the polymers disclosed in "Aqueous Dispersions of Crosslinked Polyurethanes", by Tirpak, R. E. and Markusch, P. H., *Jour Coating Tech*, pp 49-54, vol. 58, No. 738, (July '86); (v) an unsaturated polyether unit such as poly(l-methylenefuran); (vi) a cyclic acetal repeating unit such as poly(vinyl butyral); an aminimide repeating unit such as poly(methacrylimide trimethylamine); and, (vii) water dispersible or emulsifiable epoxides such as glycidyl ether bisphenol-A epoxy/diethanolamine.

Most preferred are film formers which are soluble in an aqueous sizing solution, but the method of coating the glass is not critical provided a sufficient amount of film former is deposited to catalyze a reaction in which allylic Cl moieties in the VC resin chain are covalently bonded to an aminosilane. Less preferred are non-aqueous solutions, because of difficulty dealing with an organic solvent economically, and aqueous dispersions which are binary colloid systems in which particles of polymer are dispersed in a continuous phase (water). More preferred because of better stability are emulsions which are colloidal mixtures of two immiscible fluids, one being dispersed in the other in the form of fine droplets, the one preferably being water.

Any aminosilane coupling agent in which the silanol end couples to the glass leaving an amino-functional end for coupling the PVC, may be used. In addition to the specific ones represented by the formula (I) hereinabove, these may be represented by the general formula

  (II)

wherein A represents an amino functional radical which bonds with the VC resin, and, B represents a hydrolyzable radical which leads to bonding of the silane silicon atom to the glass surface through oxane bonds such as —SiOSi—, or —AlOSi— bonds.

In the above formula (II), A typically represents an aminoalkyl radical such as $H_2NCH_2CH_2CH_2—$ or $H_2NCH_2CH_2NHCH_2CH_2CH_2$. Numerous commercially available aminosilanes represented by formula (I) are disclosed in the Rahrig '360 patent, and the polyaminosilanes such as the diaminosilanes and triaminosilanes are most preferred.

Evaluation of the adhesion of glass fiber to VC resin in a composite was done by measuring the composite tensile strengths and the Izod impact strengths, both notched and unnotched. In addition, the scanning electron microscopy was used to examine the fracture surfaces of composite specimens to determine when failure was not cohesive failure.

Though XPS studies of silanes on glass surfaces have been published, none has been published correlating quantitative spectroscopic measurements of fiber-matrix adhesion with microscopic and macroscopic measurments of interfacial strength in GFR composites, particularly short fiber GFR composites.

Such XPS measurements were made with PVC composites in which the PVC was removed by dissolving in THF, then extracted in THF for a week (7 days) using a soxhlet apparatus. The data were collected on glass fibers taken from a series of composites in which the film formers were varied, but used at the same weight percent level. The ratio of total Cl, which could only have been derived from the PVC coupled to the glass, to total C was measured as the ratio of Cl(2p)/C(1s) peaks, and these ratios correlated to the tensile strength of each sample, all of which samples contained 30 wt % glass fibers.

Glass fibers for use herein are conventionally sized with known aminosilane coupling agents and film formers, surfactants, lubricants and the like, but the fibers have unexpectedly shown an improvement in strength of a composite reinforced with them, such that a PVC composite containing 30 wt % glass has a minimum tensile strength of 12,000 psi and an unnotched Izod impact of at least 6.0 ft.lb/in$_2$. Such strength was never before deliberately or reproducibly attained, except in the aforesaid '360 Rahrig patent.

Though the type of glass, and the diameter of the fibers is not critical, relatively soda-free lime-aluminum borosilicate glass, such as "E" and "S" glass is preferred, drawn into filaments having a diameter less than 20 microns, preferably from 10 to about 16 microns.

The length of the filaments, and whether they are bundled into fibers and the fibers bundled, in turn, into yarns, ropes or rovings, or woven into mats, and the like, are not critical to the invention, but it is most convenient to use filamentous glass in the form of chopped srrands from about 1 mm to about 27 mm long, preferably less than 5 mm long. In the composition most preferably used for producing pellets in the size range from about 3 mm to about 8 mm in equivalent diameter, which pellets are used to mold shaped articles, even shorter glass fiber lengths, generally less than 1 mm will be encountered because, during compounding, considerable fragmentation will occur, some fibers being as short as 100 microns.

The best properties of the thermoformed composites are obtained when the glass fibers are present in an amount in the range from about 5% to about 50% by wt, based on the wt of combined glass fibers and resin; and the fibers are in the range from about 500 microns to about 1 mm long. It will be appreciated that less than 5% by wt fibers has little reinforcing value, and more than about an equal part by wt of glass fibers, relative to the amount of VC resin, results in a mixture which cannot be satisfactorily processed.

The aminosilane is generally liquid and, because the amount to be deposited on the fibers is relatively small, unhydrolyzed aminosilane is applied to the fibers from a solution, dispersion or emulsion, usually in water, of preselected concentration.

The GFR VC thermoplastic resin composition in the best mode of this invention consists essentially of 100 parts by wt of VC resin, and from 10% to about 35% by wt of glass fibers coated with from 0.2% to about 0.6% by wt of a specified aminosilane, and from 0.2% to about 0.6% by wt of a specified film former. If the amounts of each of the foregoing is substantially outside the specified ranges, the moldability and processability of the glass fibers and resin is reduced, and both the dry strength and wet strength are vitiated.

As used herein, the term "consists essentially of" means that the named ingredients are essential, though other ingredients which do not vitiate the advantages of the invention can also be included. Such ingredients may include conventional additives such as fillers like talc, mica, clay and the like, light stabilizers, heat stabilizers, antioxidants, pigments and dyes as may be required for a particular purpose, it being recognized that the amount of the additive(s) used will affect the physical properties of the thermoformed composite.

Preparation of VC Homopolymer Composites for Testing

All the compounding ingredients except the chopped glass strands were 'powder-mixed' on a Henschel high speed mixer at 3000 rpm for 30 sec. Each powder mixture was then milled on a Getty Model 60 4"×9" electric mill at a mill roll temperature of 215° C. using a roll separation of 0.025". Then 105 g of the powder is fed to the mill and fused in about 1 min after which 44 g of chopped glass fibers about 6.4 mm long, which have been treated with an aminosilane and film former were added to the VC homopolymer while milling is continued. The GFR sheets were taken off the mill and labeled to distinguish the mill direction from the transverse direction.

The milled sheets were constant volume molded into 6"×6"×0.05" plaques. In this procedure the mold was preheated to 199° C. for 10 min. Then 65 g of the GFR VC sheet were added to the mold. Care was taken to assure that all mill stock added to the mold was maintained at the same orientation. The mold was then placed into the press and over a 1 min time span, a pressure and release schedule of 5, 10, 20 and 30,000 lbf (pounds force) was followed. The pressure was then pumped to 30,000 lbf a second time and maintained for 1.5 min. The mold was then transferred to a cold press and allowed to cool for 5 min under pressure. Tensile dumb bells were cut and routed from these plaques. Again care was taken to identify sample orientation relative to the mill direction during the operation of these tensile bars.

The following film formers, all of which met the criterion of at least 6 ft.lb/in² unnotched Izod, and 12,000 psi tensile (dry), for 30 wt % glass fibers were compared for wet and dry strengths, and the Cl/C ratio:

1. poly(vinyl pyrrolidone) mol wt 40,000.
2. poly(ethyleneimine, hydroxyethylated) 31% in water.
3. poly(1,1-dimethyl-3,5-dimethylene piperidinium) chloride, 20% in water.
4. poly(ethylene oxide:propylene glycol) used in '360 patent For making a comparison, all composites were prepared in exactly the same manner using 100 parts by wt Geon 110×346 PVC, 30 parts by wt glass fibers, and 3 parts by wt Thermolite 32 dibutyl tin bisisooctylthioglycolate stabilizer.

A proton magnetic resonance (pmr) spectra of a thermoformed PVC sample treated with the same aminosilane used in all the samples was obtained as described in the '360 patent, and provides the same evidence of reaction between the amino-functional groups of the coupling agent and the allylic Cl moiety, namely a peak at 5.65 ppm (delta scale).

To determine wet strength, the tensile bars were submerged in a constant temperature 50° C. water bath for 168 hr, after which they were withdrawn, patted to surface dryness with a paper towel, then tested in an Instron. Each sample was tested within 1 hr from the moment it was removed from the water bath.

The comparative data are set forth in the following Table.

TABLE

| No. | Izod* notched | Izod* unnotched | Tensile dry psi | Tensile wet** psi | Modulus dry psi | Modulus wet** psi | XPS $\frac{Cl(2p)}{C(1s)}$ |
|---|---|---|---|---|---|---|---|
| 1. | 2.149 | 6.657 | 15,541 | 15,051 | 1.344 MM | 1.373 MM | 0.917 |
| 2. | 1.958 | 6.143 | 14,230 | 10,955 | 1.437 MM | 1.271 MM | 1.12 |
| 3. | 2.160 | 6.375 | 12,804 | 11,069 | 1.357 MM | 1.395 MM | 0.971 |
| 4. | 2.091 | 6.750 | 12,889 | 12,811 | 1.417 MM | 1.376 MM | 0.946 |

*Izod measured in ft. lb/in²
**after soaking 168 hr in 50° C. water.
MM = million In an analogous manner, composites are made from CPVC and cut into tensile bars. An improvement in tensile strength of a GFR CPVC sample is obtained as long as the film former used satisfies the basicity and Cl/C ratio set forth hereinabove.

Pellets of the composition of this invention are preferably formed in a pelletizing extruder after the composition is masticated in a Buss Kneader into which the VC resin and other compounding ingredients are fed, as described in the '360 patent. The pellets may then be extruded or pultruded. Sheets of GFR PVC may be prepared by impregnating glass mat, sized as described hereinabove, with PVC so that there is about an equal weight of resin and glass fibers in each sheet. Several such sheets cut to a predetermined configuration are stacked in a mold and conventionally molded at a temperature of 160°–200° C. and a pressure of about 1000 psi (about 30,000 lbf) to form a shaped article.

We claim:
1. In a thermoplastic composition of vinyl chloride resin and glass fibers particularly well-adapted to be thermoformed, comprising a mixture of,
   (a) from about 50 percent to about 95 percent by weight (% by wt) based on the combined weight of glass fibers and vinyl chloride resin, of a vinyl chloride resin in which the vinyl chloride portion of each repeating unit contains from about 57% to about 72% by wt of chlorine,

(b) a stabilizer for said vinyl chloride resin, present in an amount sufficient to provide desired stability of the composition during thermoforming, and, (c) from about 5% to about 50% by wt of glass fibers having a diameter less than about 20 microns, wherein said glass fibers are coated with a size consisting essentially of (i) an aminosilane coupling agent having a reactive amine moiety which upon reaction with said resin results in a compound having a peak in a proton magnetic resonance spectra at 5.65 ppm, and (ii) a polymer film former, the improvement consisting essentially of said film former having a basicity greater than that of poly(vinyl acetate) and sufficient to leave enough said resin coupled to said fibers after thermoforming, to yield a ratio of total chlorine to carbon Cl(2p)/C(ls) of at least 0.91, measured as the ratio of areas under the peaks, after extraction of said composition, after thermoforming, with tetrahydrofuran.

2. In a thermoplastic composition of vinyl chloride resin and glass fibers particularly well-adapated to be thermoformed, comprising a mixture of, (a) from about 50 percent to about 95 percent by weight (% by wt) based on the combined weight of glass fibers and vinyl chloride resin, of a vinyl chloride resin in which the vinyl chloride portion of each repeating unit contains from about 57% to about 72% by wt of chlorine, (b) a stabilizer for said vinyl chloride resin, present in an amount sufficient to provide desired stability of the composition during thermoforming, and, (c) from about 5% to about 50% by wt of glass fibers having a diameter less than about 20 microns, wherein said glass fibers are coated with a size consisting essentially of (i) an aminosilane coupling agent having a reactive amine moiety which upon reaction with said resin results in a compound having a peak in a proton magnetic resonance spectra at 5.65 ppm, and (ii) a polymer film former, the improvement consisting essentially of said film former being selected from the group consisting of (A) polymers with a nitrogen-containing repeating unit, and (B) dispersible or emulsifiable epoxide polymers, present in an amount sufficient to catalyze a reaction which generates sufficient allylic Cl moieties in said resin chains which are covalently bonded to an aminosilane, so that upon thorough extraction of a glass fiber reinforced composite of said resin with tetrahydrofuran, X-ray photoelectron spectroscopic examination yields a ratio of total chlorine to total carbon remaining on the surface of the glass fibers, "Cl(2p)/C(ls)", as measured from the areas under the peaks, is at least 0.91.

3. The composition of claim 2 wherein said nitrogen-containing repeating unit in said film former is selected from the group consisting of amine, amide, aminimide, triazine, ureylene and urethane.

4. The composition of claim 3 wherein said film former is selected from the group consisting of
poly(vinyl pyrrolidone),
melamine resin,
glycidyl ether bisphenol-A epoxy/diethanolamine,
poly(ethyleneimine, hydroxyethylated),
poly(methacrylimide trimethylamine), and,
poly(1,1-dimethyl-3,5-dimethylene piperidinium) chloride.

5. The composition of claim 2 wherein said vinyl chloride resin is a homopolymer of vinyl chloride containing about 57% by wt chlorine, or a chlorinated poly(vinyl chloride) containing from about 58% to about 72% by wt chlorine.

6. The composition of claim 5 wherein said aminosilane is present in an amount in the range from 0.2% to 0.6% by wt based on 100 parts of pristine glass fibers; and, said film former is present in an amount in the range from 0.2% to 0.6% by wt.

7. The composition of claim 6 wherein said poly(vinyl chloride) has an inherent viscosity in the range from about 0.53 to about 1.1.

* * * * *

UNITED STATES PATENT AND TRADEMARK OFFICE
CERTIFICATE OF CORRECTION

PATENT NO. : 4,801,627

DATED : Jan. 31, 1989

INVENTOR(S) : Douglas B. Rahrig, et al.

It is certified that error appears in the above-identified patent and that said Letters Patent is hereby corrected as shown below:

The term of this patent subsequent to August 20, 2002, has been disclaimed.

Signed and Sealed this

Twenty-fifth Day of July, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,801,627
DATED : January 31, 1989
INVENTOR(S) : Douglas Bruce Rahrig et al It is certified that error appears in the above-identified patent and that said Letters Patent is hereby corrected as shown below:

Col. 2, line 62, "pootoelectron" should read ---photoelectron---

Col. 6, line 44, "srrands" should read ---strands---.

Signed and Sealed this

Twenty-ninth Day of August, 1989

Attest:

DONALD J. QUIGG

Attesting Officer

Commissioner of Patents and Trademarks